United States Patent

[11] 3,591,258

| [72] | Inventor | Morley S. Lipsett<br>Norwalk, Conn. |
|---|---|---|
| [21] | Appl. No. | 766,710 |
| [22] | Filed | Oct. 11, 1968 |
| [45] | Patented | July 6, 1971 |
| [73] | Assignee | The Perkin-Elmer Corporation<br>Norwalk, Conn. |

[54] OPTICAL ELEMENT MOUNT
4 Claims, 3 Drawing Figs.

[52] U.S. Cl. .................................................. 350/257,
24/201
[51] Int. Cl. .................................................. G02b 7/02
[50] Field of Search .................................................. 350/245–
—257, 310; 351/157; 24/201 V

[56] References Cited
UNITED STATES PATENTS

| 3,297,392 | 1/1967 | Ballmer .................... | 350/178 |
| 3,378,851 | 4/1968 | McBrayer .................... | 351/156 UX |
| 1,146,948 | 7/1915 | Patterson .................... | 350/252 |
| 2,484,464 | 10/1949 | Quigley et al. .................... | 350/255 |
| 3,171,886 | 3/1965 | Holt et al. .................... | 350/67 |

FOREIGN PATENTS

| 15,169 | 6/1912 | Great Britain .................... | 350/252 |

Primary Examiner—David Schonberg
Assistant Examiner—Michael J. Tokar
Attorney—Edward R. Hyde, Jr.

ABSTRACT: Shear stresses between an optical element and its supporting mount are substantially eliminated by providing a mount in which a plurality of springlike elements extending upward from the supporting structure form a seat for the optical element and prevent surface contact between the optical element and the supporting structure.

PATENTED JUL 6 1971

3,591,258

INVENTOR.
Morley S. Lipsett
BY
Irving M. Kriegsman
ATTORNEY.

OPTICAL ELEMENT MOUNT

This invention relates to mounts for optical elements. More particularly, this invention relates to mounts for supporting heavy, high precision optical elements.

One of the problems that arises when using optical elements that are relatively heavy is that they tend to deflect under their own weight when seated in their mount. To minimize this effect, mounts have been designed to distribute the weight of the optical element over the supporting structure as much as possible. For example, mounts have been constructed in which the optical element rests on a flexible strap type support. Mounts have also been constructed in which the optical element rests on a support made up of a plurality of judiciously positioned blocks. The blocks usually contain a mylar or cork pad on their top surface so as to provide a soft seat for the optical element. Regardless of which arrangement is used, a sizable surface area of the optical element rests on and is in direct contact with a sizable surface area of the supporting structure. Thus, any expansion or contraction of the supporting structure, such as may be caused by temperature changes, produces shear stresses in the optical element whenever it is in surface contact with the optical element. These shear stresses result in a warping or disfiguring of the optical element. For many applications, the warping caused by these shear stresses is of sufficient magnitude to render the optical element useless.

Accordingly, it is an object of this invention to provide a new and improved mount for an optical element.

It is another object of this invention to provide a new and improved mount for use in supporting a heavy, high precision optical element.

It is still another object of this invention to provide a mount for a heavy optical element in which the shear stresses between the optical element and the mount are reduced to a minimum.

It is yet still another object of this invention to provide a mount for an optical element in which static friction between the mount and the optical element being supported is reduced to a minimum and yet the weight of the optical element is distributed over the mount.

The above and other objects are achieved by constructing a mount in which a plurality of springlike elements extending upward from a supporting structure form a seat for and support the weight of the optical element. The optical element rests on these springlike elements and does not come in contact with any surface area of the supporting structure, thus, friction between the optical element and the supporting structure is effectively eliminated.

One or more springlike elements may extend upward from any one point on the supporting structure. However, the distance between adjacent points is such that the springlike elements from one point never come in contact with the springlike elements from an adjacent point.

Other features and advantages of the invention will become apparent on reading the following detailed description when taken in connection with the accompanying drawings in which like reference numerals represent like parts and wherein.

Figure 1:
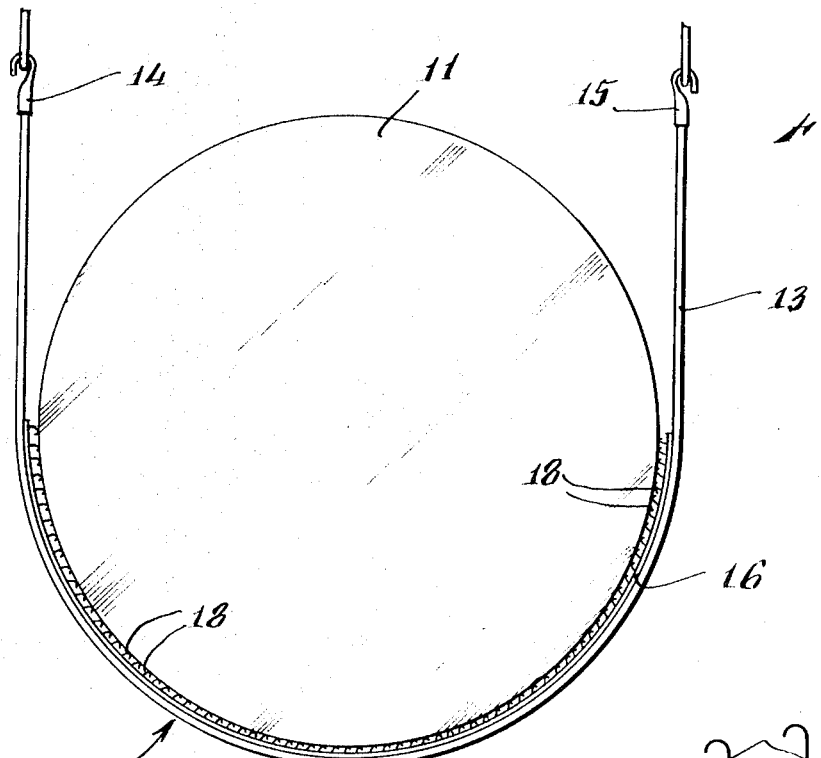
FIG. 1 is a schematic view of an optical element supported in one type of mount constructed according to this invention.

Referring now to FIG. 1, there is shown an optical element 11 seated in a mount 12. Optical element 11 may be, for example, a large diameter mirror or lens. Mount 12 includes a flexible strap 13 connected at its ends to hook members 14 and 15. Strap 13 may be made out of metal, leather or any of the other well-known materials ordinarily used. Mount 12 further includes a pad member 16 disposed on and preferably secured to the upper surface of strap 13. Optical element 11 rests on the pad member 16.

Figure 2:
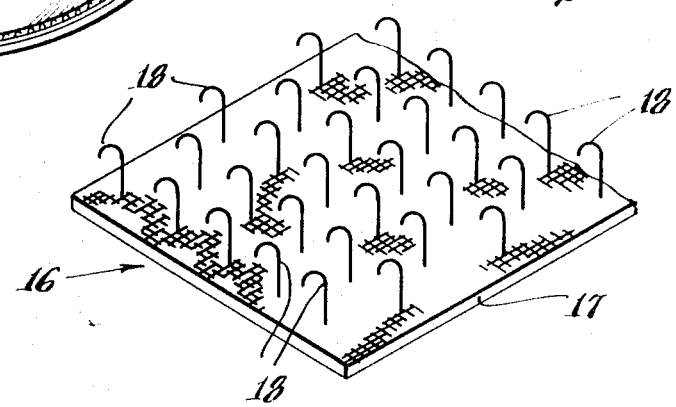
FIG. 2 is an enlarged perspective view of a portion of the pad shown in FIG. 1.

Referring now to FIG. 2, there is shown an enlarged perspective view of a portion of the pad member 16. As can be seen, the pad member 16 includes a base 17, which may be in the form of a strip of nylon, cloth or similar material and a plurality of elongated, spaced apart, springlike elements 18 which extend upward from the base 17. Springlike elements 18 may be made out of nylon or any other relatively strong yet flexible material and are preferably hooked, looped shaped or otherwise turned down at their extremities so that the optical element being supported does not rest on a plurality of points. The spacing between adjacent springlike elements 18 is such that they are relatively close but do not contact each other when supporting the optical element 11.

In U.S. Pat. No. 3,009,235, there is disclosed a fastening device made up of two strips of tape, one containing a plurality of hooks and the other containing a plurality of loops. The fastening device is known under the trade name of Velcro tape. It has been found that either one of these two strips, preferably the strip containing the hooks, may be used (separately) as the pad member 16.

Figure 3:
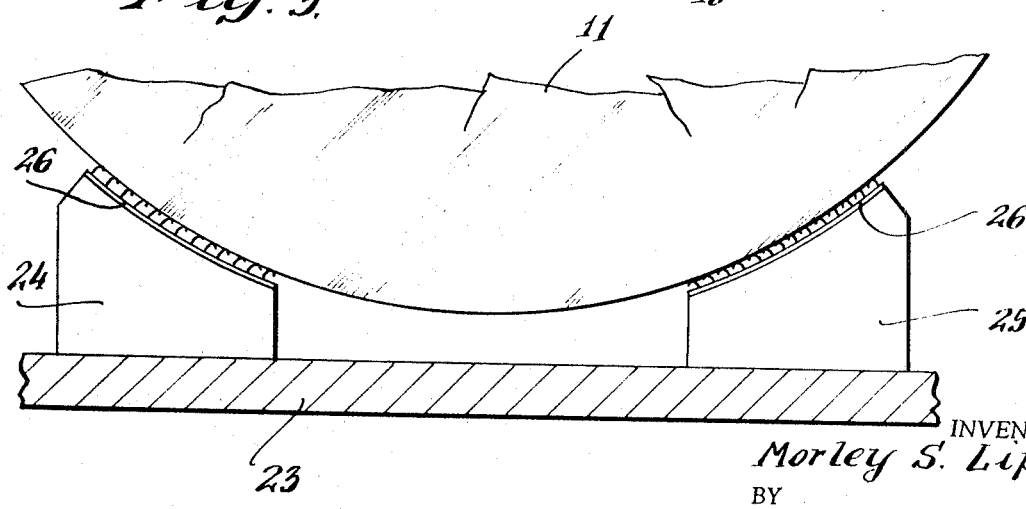
FIG. 3 is a schematic view of an optical element supported in another type mount constructed according to this invention.

Referring now to FIG. 3, there is shown an optical element 21 resting on a mount 22. Mount 22 includes a base 23 and a pair of blocks 24 and 25 mounted on the base 23. On top of each block is a pad 26 which is identical in construction to the pad 16 shown in FIG. 1.

It should be noted that the invention is in the pad member described above and that the details and construction of the supporting structure on which the pad rests are not pertinent to or part of the invention.

It is also to be understood that it is within the scope of this invention to provide a mount in which the spring-like members are directly connected to the supporting structure rather than to a pad which is placed on the supporting structure as shown in the drawings.

Obviously, many modifications and variations of the present invention are possible in light of the above teachings. It is, therefore, to be understood that within the scope of the appended claims, the invention may be practiced otherwise than as specifically described.

What I claim is:

1. A mount for an optical element comprising:
   a. support means, and
   b. pad means resting on top of said support means, said pad means including a base portion and a plurality of elongated springlike members extending upward from closely spaced points on said base portion providing the sole support for said optical elements, said points being spaced so that the members from any one of said points are out of contact with the members from adjacent points, the outward ends of the members being turned over to form curved extremities engaging the optical element.

2. The mount of claim 1 in which said support means comprises a base, and a plurality of blocks mounted on said base and positioned so as to form a seat for said optical element.

3. The mount of claim 1 in which said support means comprises a flexible strap forming a seat for supporting the optical element, said pad means being disposed on the top surface of the strap 4. In an optical element mount wherein the top surface of one member forms a seat for at least a portion of the optical element being supported thereby, the improvement comprising a plurality of elongated springlike members extending upward from closely spaced points on said surface for supporting said optical element and eliminating static friction between said optical element and said member, said points being spaced so that the members from any one of said points are out of contact with the members from adjacent points, the outward ends of the members being turned over to form curved extremities engaging the optical element.